(12) United States Patent
Gauthier, Jr. et al.

(10) Patent No.: US 10,002,104 B2
(45) Date of Patent: Jun. 19, 2018

(54) DUAL AUTONOMOUS TELEMETRY DATA ACQUISITION SYSTEM AND REAL TIME OPTO-ISOLATED RECEIVERS FOR USE THEREWITH

(71) Applicant: The Johns Hopkins University, Baltimore, MD (US)

(72) Inventors: Leo R. Gauthier, Jr., Ellicott City, MD (US); Harlan Ray, III, Davidsonville, MD (US)

(73) Assignee: The Johns Hopkins University, Baltimore, MD (US)

( * ) Notice: Subject to any disclaimer, the term of this patent is extended or adjusted under 35 U.S.C. 154(b) by 190 days.

(21) Appl. No.: 15/170,987

(22) Filed: Jun. 2, 2016

(65) Prior Publication Data

US 2017/0039161 A1 Feb. 9, 2017

Related U.S. Application Data

(60) Provisional application No. 62/200,183, filed on Aug. 3, 2015, provisional application No. 62/200,179, filed on Aug. 3, 2015.

(51) Int. Cl.
*G06F 13/42* (2006.01)
*H04L 7/00* (2006.01)
*G06F 13/40* (2006.01)

(52) U.S. Cl.
CPC ...... *G06F 13/4282* (2013.01); *G06F 13/4068* (2013.01); *H04L 7/0037* (2013.01)

(58) Field of Classification Search
CPC . G06F 13/4282; G06F 13/4068; H04L 7/0037
See application file for complete search history.

(56) References Cited

U.S. PATENT DOCUMENTS

| | | | | |
|---|---|---|---|---|
| 4,357,605 A * | 11/1982 | Clements | ............... | H04B 3/542 340/310.11 |
| H718 H * | 12/1989 | Hester | ........................... | 377/114 |
| 5,483,535 A * | 1/1996 | McMillen | ............. | H04L 12/433 370/452 |
| 8,838,846 B1 * | 9/2014 | Tang | ..................... | G06F 13/385 710/18 |
| 9,250,299 B1 * | 2/2016 | Yarlagadda | ............ | G01D 21/02 |
| 2006/0265540 A1 * | 11/2006 | Mass | ................... | G06F 13/4068 710/305 |
| 2007/0279112 A1 * | 12/2007 | Maeda | ................. | G11C 7/1072 327/158 |
| 2012/0092981 A1 * | 4/2012 | West | ................... | H04L 41/0806 370/216 |

* cited by examiner

*Primary Examiner* — Jing-Yih Shyu
(74) *Attorney, Agent, or Firm* — Noah J. Hayward

(57) ABSTRACT

A serial digital data acquisition receiver (SDDAR) or system of receivers may include an opto-isolator assembly, sampling logic and a USB interface. Both a CLK signal and a DATA signal may each pass through the opto-isolator assembly upon receipt of the CLK and DATA signals at the SDDAR or system. The sampling logic may be operably coupled to the opto-isolator assembly and be configured to determine a point at which to sample the DATA signal based on state changes in the CLK signal. The USB interface may be operably coupled to the sampling logic and an output terminal. The USB interface may be configured to provide telemetry data for processing, display or recording at the output terminal, and may be configured to enable the SDDAR or system to be powered from the output terminal.

16 Claims, 4 Drawing Sheets

DUAL AUTONOMOUS TELEMETRY DATA ACQUISITION SYSTEM AND REAL TIME OPTO-ISOLATED RECEIVERS FOR USE THEREWITH

CROSS-REFERENCE TO RELATED APPLICATIONS

This application claims the benefit of and priority to U.S. Provisional Application No. 62/200,179 and U.S. Provisional Application No. 62/200,183 each of which were filed on Aug. 3, 2015, the entire contents of each which are hereby incorporated herein by reference.

STATEMENT OF GOVERNMENTAL INTEREST

This invention was made with Government support under contract number N00024-13-D-6400 awarded by the Naval Sea Systems Command (NAVSEA) and contract number HQ0147-12-D-0004 awarded by the Missile Defense Agency (MDA). The Government has certain rights in the invention.

TECHNICAL FIELD

Exemplary embodiments of the present disclosure generally relate to serial digital telemetry data gathering technology, and more specifically relate to a system and corresponding hardware for providing relatively simple and accurate telemetry data gathering and processing capabilities.

BACKGROUND

Test ranges and other organizations often collect and distribute telemetry data in serial streams of data bits that are clocked and distributed in real-time at about 10 Mbits per second (or more). In some cases, when telemetry data are received at a ground station, the radio frequency (RF) receiver typically converts the data signal back to a serial digital stream and a bit synchronizer regenerates the clock signal to facilitate data distribution by keeping the data stream synchronized. In other cases, the serial data and clock are sent serially over an optical fiber or an electrical cable.

There are three main factors that can adversely influence telemetry data acquisition. The three main factors include third party equipment (TPE), environmental factors (e.g., temperature and electromagnetic interference (EMI)), and power/grounding quality. With respect to each of these three main factors, there are additional considerations that affect telemetry data acquisition.

The TPE and cables may be provided between the clock and data signals generated by the test range and the point at which the user has access to the clock and data signals. The TPE may include distribution amplifiers, multiplexors, demultiplexors, derandomizers, decryptors, and cables. The TPE may introduce distortions into the clock and data signals, and the distortions may manifest themselves as timing skew between the clock and data signals and/or as polarity changes and/or as signal rise time changes that adversely affect the ability to know when to sample the data and how best to correctly record the data.

Environmental factors may impact the equipment when electromagnetic interference (EMI) is encountered or as temperatures change. Environmental temperature changes, or temperature changes relative to the equipment itself (e.g., as the equipment heats up) can each negatively affect telemetry data acquisition. In this regard, various operational parameters that are applicable at startup may no longer be applicable as temperature changes begin to take effect or as nearby equipment generates EMI.

The last main factor is power/grounding quality. Power/grounding quality is descriptive of the reliability and stability of the power source and the equipment grounds. Untimely power glitches, common-mode ground voltage differences, or random loss of power, can also interrupt acquisition and degrade data reliability. Thus, any downstream telemetry acquisition system must be capable of compensating for and correcting for the distortions mentioned above.

The cost and complexity of systems for gathering telemetry data is generally high. Moreover, especially in light of the challenges discussed above, gathering of telemetry data typically requires a skilled and experienced operator to properly set up the complex equipment and to ensure that the equipment is tested and then maintained in good working order as the data gathering is commenced and environmental or other conditions change. The complex systems that are generally used in this area also commonly require proprietary software that can be buggy and create reliance on bug fixes, patches and software updates. To address some of these drawbacks, solutions have been sought to minimize acquisition time and maximize the amount of recoverable data by improving acquisition technologies. The data systems described herein are capable of being used as generic waveform recorders. They also may be configured to obviate the need for best source selectors and to provide optimal telemetry processing and recording when multiple telemetry signals of differing quality are available.

BRIEF SUMMARY OF SOME EXAMPLES

Some example embodiments may enable the provision of a data acquisition system for gathering telemetry data that is relatively simple and yet very accurate.

In one example embodiment, a serial digital data acquisition receiver (SDDAR) is provided. The SDDAR may include an opto-isolator assembly, sampling logic and a USB interface. Both a CLK signal and a DATA signal may each pass through the opto-isolator assembly upon receipt of the CLK and DATA signals at the SDDAR. The sampling logic may be operably coupled to the opto-isolator assembly and be configured to determine a point at which to sample the DATA signal based on state changes in the CLK signal. The USB interface may be operably coupled to the sampling logic and an output terminal. The USB interface may be configured to provide telemetry data for processing, display or recording at the output terminal, and may be configured to enable the SDDAR to be powered from the output terminal.

In another example embodiment, a serial digital data acquisition system is provided. The system may include a first SDDAR operably coupled to a first output terminal, and at least a second SDDAR operably coupled to a second output terminal. The first SDDAR may receive both CLK signal and a DATA signal. The second SDDAR may be operably coupled to the first SDDAR to receive the CLK and DATA signals. Each of the first and second SDDARs may include an opto-isolator assembly through which both the CLK and DATA signals pass upon receipt of the CLK and DATA signals at the first and second SDDARs, respectively, sampling logic and a USB interface. The sampling logic may be operably coupled to the opto-isolator assembly, and may be configured to determine a point at which to sample the DATA signal based on state changes in the CLK signal. The USB interface may be operably coupled to the sampling logic and a respective one of the first output terminal and second output terminal. The USB interface may be configured to provide a first serial telemetry data stream from the first SDDAR for processing, display or recording at the first output terminal and to provide a second serial telemetry data stream from the second SDDAR for processing, display or recording at the second output terminal. The USB interface may be further configured to enable the first SDDAR and the second serial digital data acquisition receiver be powered from the first output terminal and second output terminal, respectively.

In another example embodiment, a dual autonomous telemetry acquisition system is provided. The system may include a first SDDAR operably coupled to an output terminal, and a second SDDAR operably coupled to the output terminal. The first SDDAR may receive both a CLK signal and a DATA signal. The second SDDAR may be operably coupled to the first SDDAR to receive the CLK and DATA signals. Each of the first and second SDDARs may include an opto-isolator assembly, sampling logic and a USB interface. Both the CLK and DATA signals may pass through the opto-isolator assembly upon receipt of the CLK and DATA signals at the first and second SDDARs, respectively. The sampling logic may be operably coupled to the opto-isolator assembly. The sampling logic may be configured to determine a point at which to sample the DATA signal based on state changes in the CLK signal. The USB interface may be operably coupled to the sampling logic and the output terminal. The USB interface may be configured to provide a first serial telemetry data stream from the first SDDAR and a second serial telemetry data stream from the second SDDAR for processing, display or recording at the output terminal. The USB interface is further configured to enable the first SDDAR and the second SDDAR to each be powered from the output terminal. The second SDDAR may include a phase delay controller configured to enable insertion of a phase delay to the DATA signal relative to the CLK signal input to the first SDDAR.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

DETAILED DESCRIPTION

Figure 1:
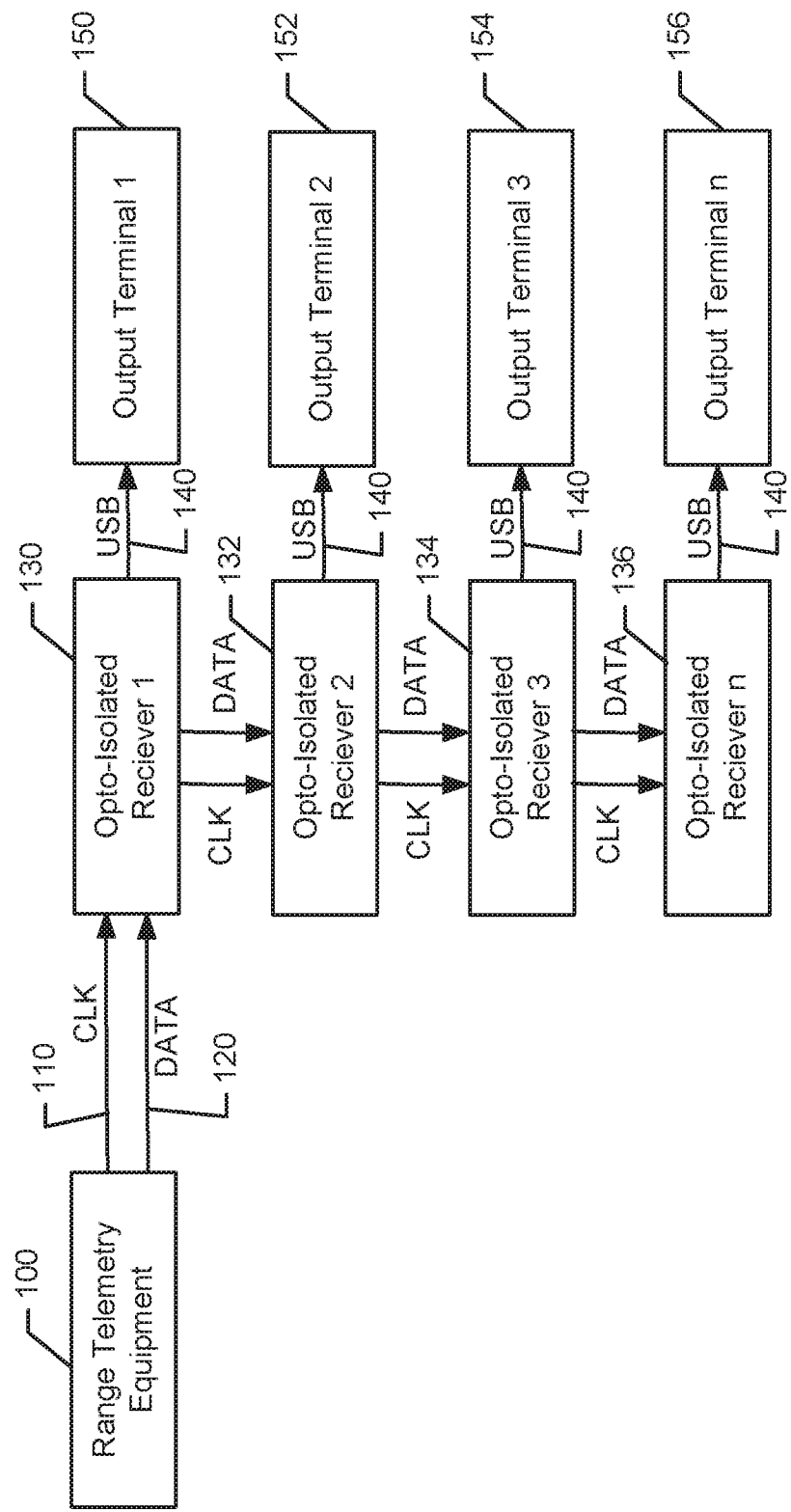
FIG. 1 illustrates a block diagram of a system for employing one or more a real-time opto-isolated telemetry receivers in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

FIG. 1 illustrates a block diagram of a system for employing a real-time opto-isolated telemetry receiver in accordance with an example embodiment. In this regard, FIG. 1 shows a series of components arranged to process telemetry data in a manner that eliminates or mitigates many of the issues discussed above. In this regard, range telemetry equipment 100 may provide both a range telemetry clock signal 110 (hereinafter "CLK") and a range telemetry data signal 120 (hereinafter "DATA") for processing or recording by other third party equipment. The range telemetry equipment is not limited to equipment that must be provided as part of a larger test range infrastructure, although this is often the case. The range telemetry equipment is the source of the serial data, whether provided by a test range or additional end-user equipment for a given application. The range telemetry equipment 100 may include one or more antennas, receivers, fiber optic modems, electrical cables, and any needed processing circuitry to provide the serial streams of DATA along with a synchronized CLK based on data generated responsive to testing of various equipment or components. The third party equipment may include various receiving, processing and/or recording devices. In an example embodiment, the DATA and CLK signals may be provided to one or more SDDARs. In particular, the SDDARs may include at least one real-time opto-isolated telemetry receiver (hereinafter "opto-isolated receiver"), of an example embodiment, to enable data to be provided to an output terminal for processing, storage and/or display. However, in some cases, a number of opto-isolated receivers may be chained together to allow provision of data to multiple output terminals. Moreover, in an example embodiment, the opto-isolated receivers may be operably coupled to the respective output terminals via a USB interface.

As shown in FIG. 1, a first opto-isolated receiver 130 may receive the CLK and DATA signals from the range telemetry equipment 100. The CLK and DATA signals may then be passed on, in a daisy-chained or series fashion, to a second opto-isolated receiver 132. The CLK and DATA signals may be further passed on in series to a third opto-isolated receiver 134 and n number of additional opto-isolated receivers (e.g., nth opto-isolated receiver 136). Each respective one of the opto-isolated receivers may also be operably coupled to a corresponding output terminal via a USB interface 140. Thus, for example, the first opto-isolated receiver 130 is operably coupled to a first output terminal 150 via a first instance of the USB interface 140, the second opto-isolated receiver 132 is operably coupled to a second output terminal 152 via a second instance of the USB interface 140, the third opto-isolated receiver 134 is operably coupled to a third output terminal 154 via a third instance of the USB interface 140, and the nth opto-isolated receiver 136 is operably coupled to an nth output terminal 156 via an nth instance of the USB interface 140. Thereby, multiple users at multiple terminals may have easy access to the opto-isolated DATA and CLK signals.

Each of the output terminals may be an instance of a personal computer, laptop, or other such computer or device that includes processing circuitry and memory that enable the corresponding output terminal to perform real-time processing, display and storage of information based on the CLK and DATA signals. Thus, for example, each of the output terminals could be associated with a different user or operator. However, multiple ones of the output terminals could also be associated with the same user, operator or entity in some cases. The output terminals may be equipped to perform real-time processing and display of data. This may include decompressing and displaying embedded video content. The display ports of the output terminals may be used to distribute real-time displays to video distribution networks so that others in remote locations may also view the real-time displays of the processed telemetry. In addition, the data may also be recorded by the output terminals. The recorded data may be processed and/or displayed at the output terminals at a later time, or may be transferred from the memory of the output terminals to other devices for processing and display at a later time.

The use of the USB interface 140 enables data to be provided for processing, display or recording at each of the respective output terminals, but further enables the opto-isolated receivers to be powered by their respective output terminals. Thus, for example, the first opto-isolated receiver 130 is powered by the first output terminal 150 via the first instance of the USB interface 140 while simultaneously providing data to the first output terminal 150 via the first instance of the USB interface 140. Similarly, the second opto-isolated receiver 132 is powered by the second output terminal 152 via the second instance of the USB interface 140 while simultaneously providing data to the second output terminal 152 via the second instance of the USB interface 140. The same relationships hold true for the third opto-isolated receiver 134 and nth opto-isolated receiver 136 relative to the third output terminal 154 and the nth output terminal 156 via their respective instances of the USB interface 140.

By employing the USB interface 140, which defines how peripheral devices operably couple to computers, a standard and streamlined method for moving serial telemetry data into the domain of the computer (e.g., the output terminal) is provided where the data can be available for real-time processing, display and storage via customized user applications. Moreover, the opto-isolated receivers become plug-and-play components that require no external power supply, and further require no device drivers to be provided on the output terminals to enable interoperability of the components. Instead, the intrinsic architecture of personal computers may be used to connect telemetry data streams to the personal computer domain. The use of the USB interface 140 may enable the opto-isolated receivers to provide a streamlined connection for high bandwidth serial data streams to be provided to multiple devices for display, processing and/or storage. The resultant system may therefore obviate the need for embedded hardware interfaces in the computer terminals, and eliminate the need for complex drivers and other software support from proprietary sources.

Figure 2:
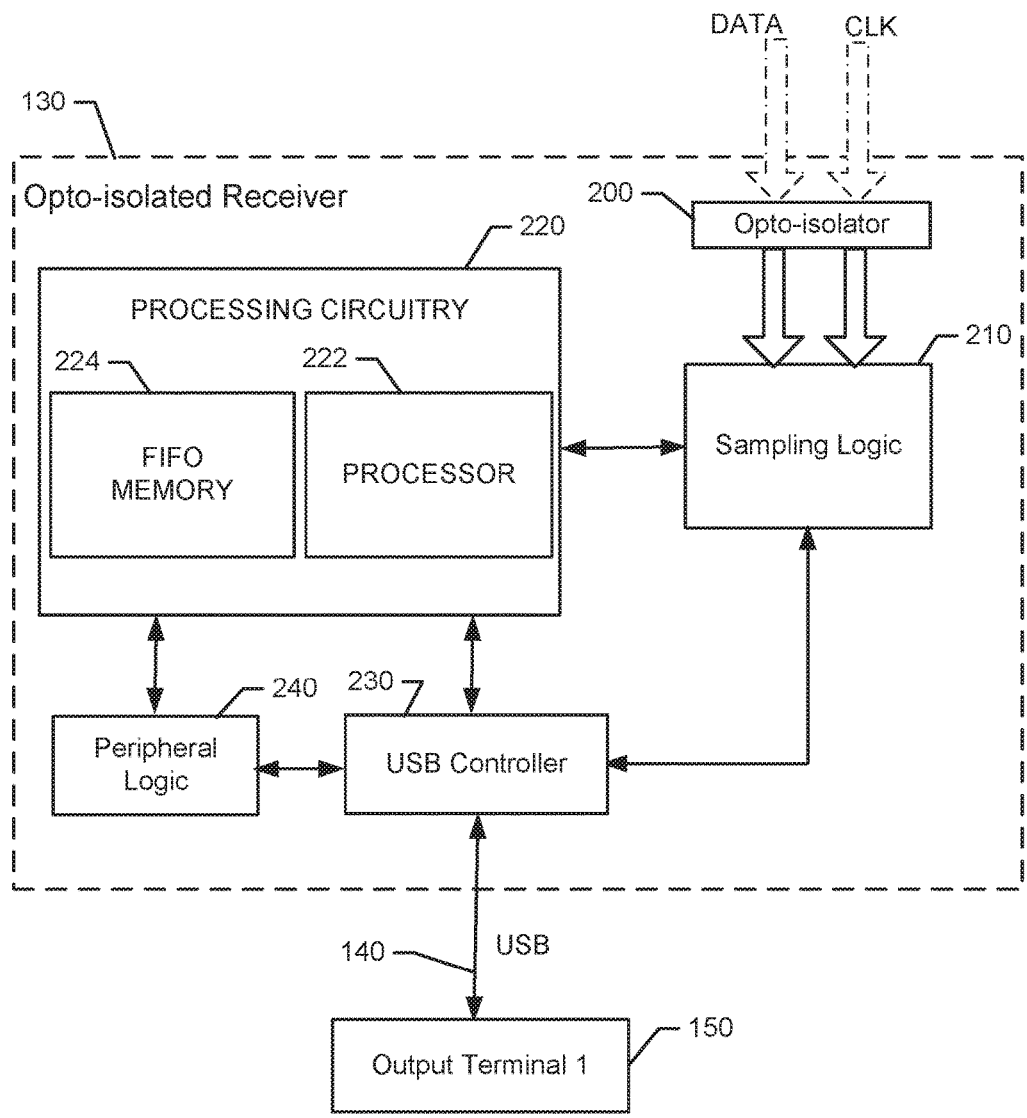
FIG. 2 illustrates a block diagram showing components of a real-time opto-isolated telemetry receiver, which employs a universal serial bus (USB) interface, in accordance with an example embodiment.

FIG. 2 illustrates a block diagram showing components of the first opto-isolated receiver 130 in accordance with an example embodiment. However, it should be appreciated that the second opto-isolated receiver 132, the third opto-isolated receiver 134, and the nth opto-isolated receiver 136 may each have the same or a substantially similar structure. As shown in FIG. 2, the first opto-isolated receiver 130 may include an opto-isolator assembly 200 through which both CLK and DATA signals may pass prior to encountering sampling logic 210. The opto-isolator assembly 200 may include a high speed optocoupler, photocoupler, or optical isolator of any suitable type to transfer each of the electrical signals (e.g., CLK and DATA) between isolated circuits (e.g., the range telemetry equipment 100 and the opto-isolated receivers) using light. The opto-isolator assembly 200 may therefore provide galvanic isolation to prevent any voltage spikes that may occur prior to the opto-isolated receivers from affecting the opto-isolated receivers and output terminals. The opto-isolator assembly 200 may provide excellent common mode voltage rejection, which can be advantageous in a range testing environment where pieces of equipment can be widely separated from each other and have distinct grounds.

The sampling logic 210 may be configured to determine the best point at which to sample data in order to have the highest likelihood of obtaining quality data. In this regard, the CLK is typically provided along with the DATA, so that the CLK can be used to determine when to sample the DATA to read or otherwise determine the information contained therein accurately. Given that the electronic components in any system may be impacted by various internal and external factors, it is possible for the wrong information to be interpreted from the DATA if the sampling does not happen at the appropriate time. Thus, the sampling logic 210 may be configured to select a sampling time relative to state changes detected in the CLK signal in order to find a "sweet spot" where the likelihood of obtaining accurate information from the DATA signal is highest. In this regard, for example, the sampling logic 210 may delay the sampling time of the DATA signal relative to detection of state changes in the CLK signal to be sure that the DATA signal sampled at the corresponding sample time is an accurate representation of the data that was intended to be conveyed at that time, and not inaccurate data associated with a transition between states or any other possible perturbation to the DATA signal.

The sampling logic 210 may operate under the control of, or in cooperation with, processing circuitry 220 of the first opto-isolated receiver 130. The processing circuitry 220 may provide the hardware that is programmed or that hosts software to configure the system for processing the CLK and DATA consistent with example embodiments. In this regard, sampling, communication via the USB interface 140, and other peripheral functions may therefore be accomplished using the processing circuitry 220.

The processing circuitry 220 may be configured to perform data processing, control function execution and/or other processing and management services according to an example embodiment of the present invention. In some embodiments, the processing circuitry 220 may be embodied as a chip or chip set. In other words, the processing circuitry 220 may comprise one or more physical packages (e.g., chips) including materials, components and/or wires on a structural assembly (e.g., a baseboard).

In an example embodiment, the processing circuitry 220 may include one or more instances of a processor 222 and memory 224 that may be in communication with or otherwise control other components of the first opto-isolated receiver 130. As such, the processing circuitry 220 may be embodied as a circuit chip (e.g., an integrated circuit chip) configured (e.g., with hardware, software or a combination of hardware and software) to perform operations described herein.

Although not required, in some cases, the processing circuitry 220 may include or otherwise be configured to interact with a user interface via the user software running on the output terminal. The user interface may be used to adjust various variable settings (locally or remotely). Thus, in some cases, user interface control may be provided from the user terminal via the USB interface 140.

In an example embodiment, the memory 224 may include one or more non-transitory memory devices such as, for example, volatile and/or non-volatile memory that may be either fixed or removable. The memory 224 may be configured to store or buffer information for processing or passage on to the user terminals. In some cases, the memory 224 may be a first in first out (FIFO) memory to unambiguously preserve the ordering of the DATA sequence.

The processor 222 may be embodied in a number of different ways. For example, the processor 222 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 222 may be configured to execute instructions stored in the memory 224 or otherwise accessible to the processor 222. As such, whether configured by hardware or by a combination of hardware and software, the processor 222 may represent an entity (e.g., physically embodied in circuitry—in the form of processing circuitry 220) capable of performing operations according to embodiments of the present invention while configured accordingly. Thus, for example, when the processor 222 is embodied as an ASIC, FPGA or the like, the processor 222 may be specifically configured hardware for conducting the operations described herein. Alternatively, as another example, when the processor 222 is embodied as an executor of software instructions, the instructions may specifically configure the processor 222 to perform the operations described herein.

In an example embodiment, the processor 222 (or the processing circuitry 220) may be embodied as, include or otherwise control the sampling logic 210, a USB controller 230, and/or peripheral logic 240. As such, in some embodiments, the processor 222 (or the processing circuitry 220) may be said to cause each of the operations described in connection with such components by directing the corresponding components to undertake the corresponding functionalities responsive to execution of instructions or algorithms configuring the processor 222 (or processing circuitry 220) accordingly.

The USB controller 230 may be configured to receive data processed by the sampling logic 210 (and therefore presumably accurate information descriptive of the DATA signal), and format the data for communication to the first output terminal 150 via the USB interface 140. Power to all components of the first opto-isolated receiver 130 may also be provided via the USB interface 140, as mentioned above. The peripheral logic 240 may be configured to perform other peripheral tasks that may be defined for the opto-isolated receiver 130 (if any).

The first opto-isolated receiver 130 (and any of the other opto-isolated receivers) may therefore be configured to provide a well isolated interface to sampling logic 210 that is configurable to optimize sampling of DATA signals for provision of data extracted therefrom to the first output terminal 150 (and any of the other output terminals) via USB. This eliminates dependency on complex proprietary equipment, while also providing a very accurate data acquisition method.

Figure 3:
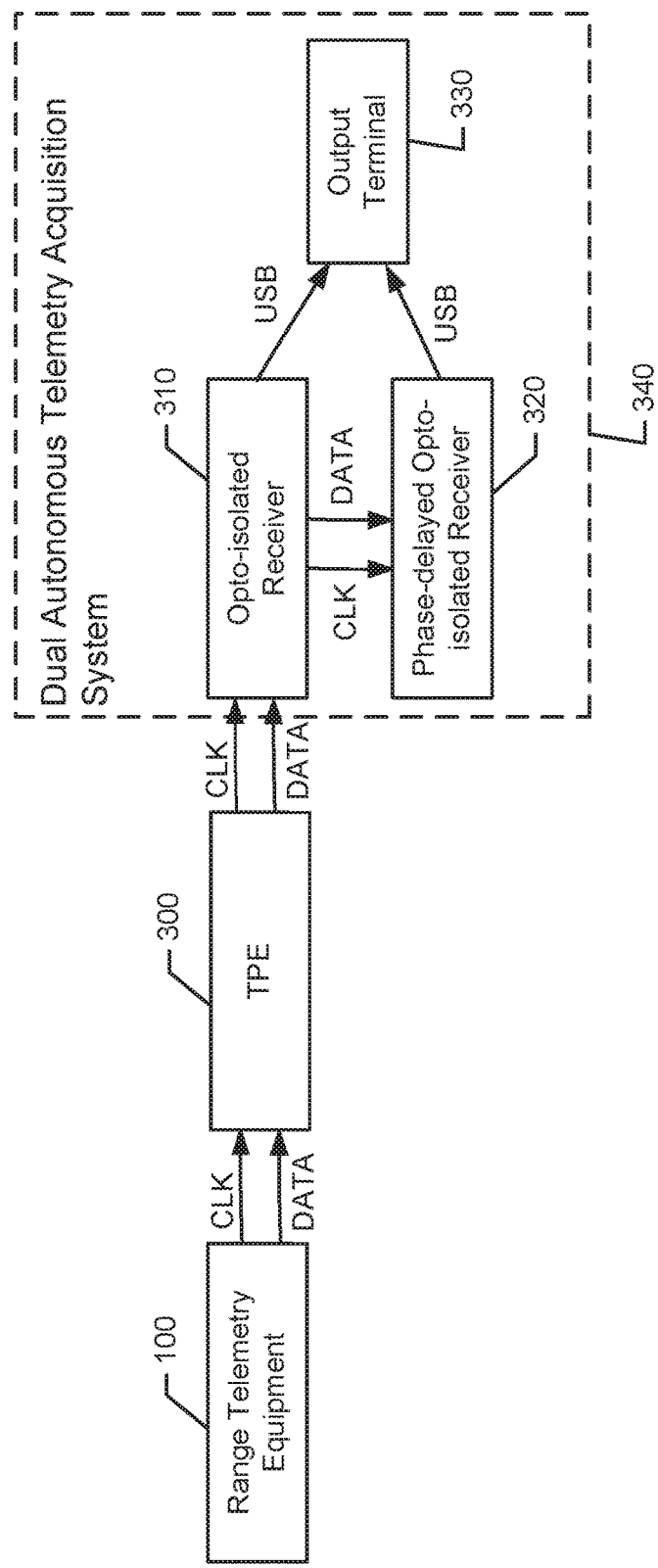
FIG. 3 illustrates a block diagram of the employment of real-time opto-isolated telemetry receivers to create a dual autonomous telemetry acquisition system in accordance with an example embodiment.

Although opto-isolated receivers of example embodiments can be used precisely as shown in FIG. 1 such that each receiver provides serial data to a corresponding single output terminal, other configurations are also possible and may provide certain advantages. For example, dual opto-isolated receivers can be configured to be operably coupled to a single output terminal to provide multiple modes of operation in some cases. FIG. 3 illustrates a block diagram of the employment of real-time opto-isolated USB telemetry receivers to create a dual autonomous telemetry acquisition system in accordance with an example embodiment.

As shown in FIG. 3, the range telemetry equipment 100 may sometimes provide the CLK and DATA signals through other third party equipment (TPE) 300. However, it should be appreciated that the TPE 300 may not be present, or could even be present in the system of FIG. 1. In any case, the CLK and DATA signals could be provided to an opto-isolated receiver 310, which may be similar to the opto-isolated receivers described above in reference to FIGS. 1 and 2. However, because of the presence of the TPE 300, The CLK and DATA signals may be daisy chained on to another opto-isolated receiver. However, the DATA signal may be phase delayed relative to the CLK by a selected amount for the second opto-isolated receiver (e.g., phase delayed opto-isolated receiver 320). Both the opto-isolated receiver 310 and the phase delayed opto-isolated receiver 320 may then provide respective data streams simultaneously (but with some selected phase difference there between) to the output terminal 330 (which may be similar to the output terminals described above). Each of the opto-isolated receiver 310 and the phase delayed opto-isolated receiver 320 may be operably coupled to the output terminal 330 via a USB interface (e.g., two respective separate instances of the USB interface).

The opto-isolated receiver 310 and the phase delayed opto-isolated receiver 320, along with the output terminal 330 may function together as a dual autonomous telemetry acquisition system 340. The dual autonomous telemetry acquisition system 340 may be configured to function in at least two operating modes that will be discussed in greater detail below. However, in any case, the dual autonomous telemetry acquisition system 340 may have the ability to compensate for and correct for distortions associated with power glitches, thermal or EMI changes, and third party equipment so that data acquisition is not interrupted and data reliability is not degraded. In conventional systems, skilled operators can be trained to identify and account for distortions caused by the factors listed above. However, in some mission critical telemetry applications, it would be preferable to minimize the acquisition time and maximize the amount of recoverable data using the dual autonomous telemetry acquisition system 340.

A first operating mode of the dual autonomous telemetry acquisition system 340 may be a record only mode, where real-time processing is not desired. When employed in the first operating mode, an untrained operator can set up and operate the system effectively. The first operating mode may include the recording of two simultaneous streams of telemetry data with a half clock cycle difference in the timing of the data strobe. By recording the two streams simultaneously with the half clock cycle difference, at least one stream is guaranteed to have valid data at all times. Post processing software (e.g., at the output terminal 330 or some other computer) can process the two data streams to normalize the data, essentially reconstructing a single perfect stream for the end user. Thus, recording of data associated with two opposite clock phases assures that the underlying information is recoverable regardless of common external influences that might affect the precise timing of the DATA signal relative to the CLK signal and regardless of the format of the telemetry.

In this regard, the width of any problem region associated with the DATA signal is generally unknown. Thus, the potential error band associated with triggering timing (e.g., with sampling logic) can tend to grow. By recording two versions of the data that are a half clock cycle off relative to each other, both can be processed and one will always have the correct DATA signal and enable avoidance of the problem region.

Another advantage of the record only mode is that there is no need for a priori knowledge of the underlying telemetry format. An untrained operator can simply connect the dual autonomous telemetry acquisition system 340 to the DATA and CLK signals provided from the telemetry range equipment 100 (or the TPE 300), and connect the USB cables to the output terminal 330 and run the dual autonomous telemetry acquisition system 340 in the record only mode. There are no complex digital waveform recorders to configure, no requirements for operators to have a priori knowledge or understanding of the telemetry format, and no driver software to be loaded and maintained. As such, the dual autonomous telemetry acquisition system 340 is effectively a plug-and-play product. After the data are recorded, a post processor (e.g., a normalizer) may recover the telemetry data from the blind recording.

The second mode of operation may be an optimal real-time processing mode. In this mode, the telemetry format may be known a priori, so that additional benefits may be obtained by a trained operator using the dual autonomous telemetry acquisition system 340 for real-time processing applications. The second mode of operation provides improvement (over having individual opto-isolated receivers paired with individual output terminals) in at least two areas relating to real-time applications. In this regard, for example, the second mode of operation may improve instantaneous auto-acquisition capability and continuous, non-intrusive "sweet spot" tracking.

Instantaneous auto-acquisition is provided by the dual autonomous telemetry acquisition system 340 by processing both data streams in parallel and displaying (e.g., at the output terminal 330) data that are known to be valid from at least one of the two simultaneously provided streams. The a priori knowledge enables performance of validation regarding selection of one of the two streams. In particular, terminal resident user software uses the a priori knowledge of the telemetry format to select the best stream for processing.

Instantaneous auto-acquisition has three main benefits. A first such benefit is that a minimal amount of data may be lost during the acquisition time. This may be a critical benefit if the crucial data were being telemetered during that time. A second benefit may be the simplification of troubleshooting. In this regard, the instantaneous auto-acquisition provides immediate feedback to the operator that is making changes to the setup of the system, so the operator can recognize when a change corrects or exacerbates a problem, and react accordingly. The operator can watch the display on the output terminal as changes are made and see in real-time how the changes impact the output. The third benefit is that instantaneous auto-acquisition provides the ability to combine multiple streams of data to produce the highest quality processed output. Based on the three benefits above, the utility and reliability of critical telemetry systems can be improved.

The second area in which the second mode of operation provides improvement (over having individual opto-isolated receivers paired with individual output terminals) relates to providing continuous, non-intrusive "sweet spot" tracking. After initial data acquisition, only one of the two data streams is actually needed for data display (e.g., at the output terminal 330). Thus, the other (non-selected) data path or stream can be used to interactively locate the best sample time (i.e., the sweet spot) by iteratively varying the DATA sample timing relative to the CLK on that data path only. As such, for example, the phase delay may be variable, and the operator can experiment with phase delay variations to find the sweet spot both initially and at any time during operation of the system. Thus, for example, if the sweet spot moves as a result of equipment heating or configuration changes, the optimal setting determined by processing the data in the second path are used to maintain optimal synchronization with data on the first data path. This additional tracking feature can help to avoid unexpected loss of synchronization (and data) that may occur when any part of the TPE 300 configuration changes.

Figure 4:
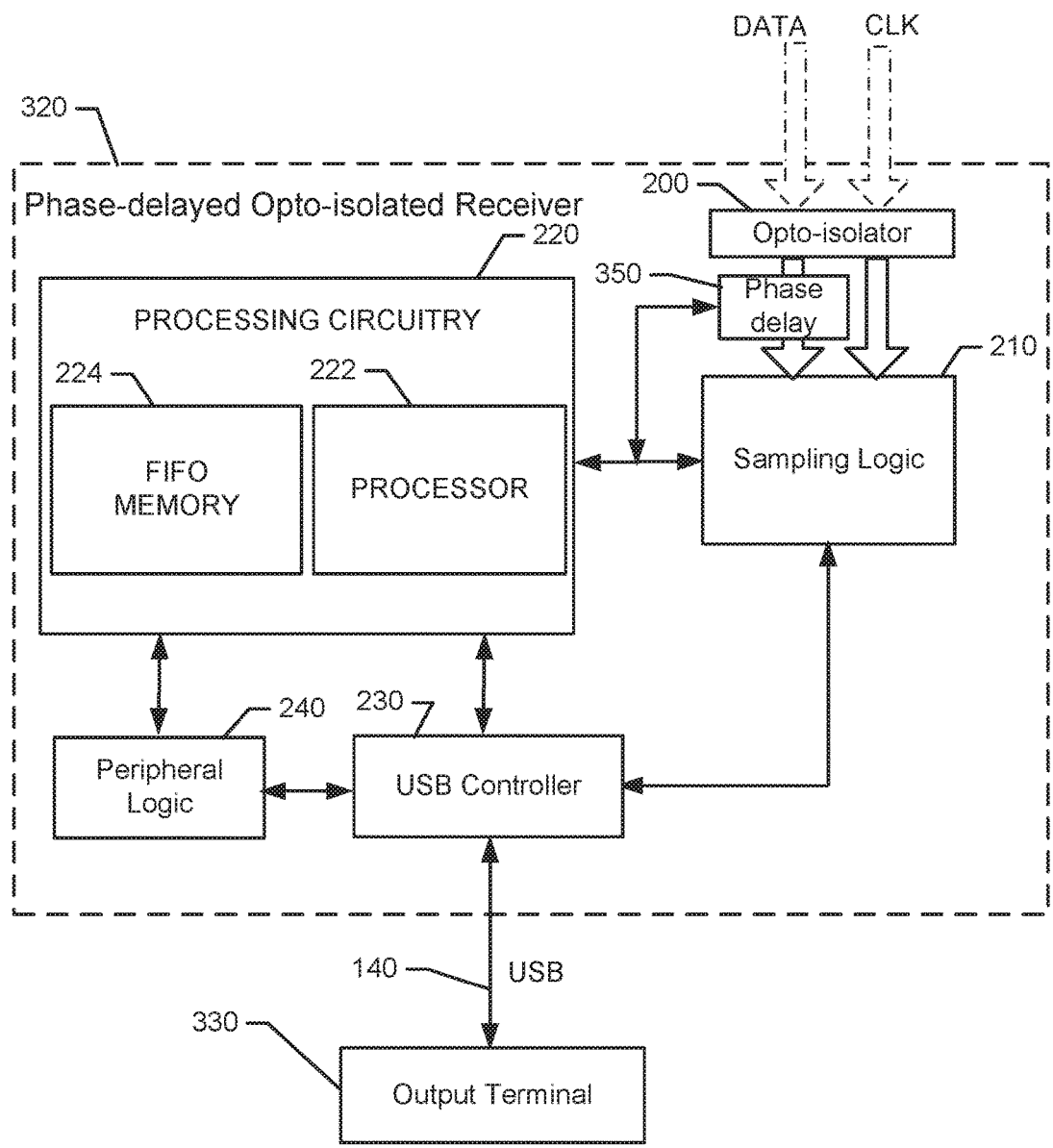
FIG. 4 illustrates a block diagram showing components of the real-time opto-isolated telemetry receiver of FIG. 2 modified to introduce phase delay in accordance with an example embodiment.

The variation of DATA sample timing relative to the CLK to conduct sweet spot tracking can be accomplished by providing the user with the ability to control phase delay. Thus, for example, as shown in FIG. 4, the opto-isolated receiver 130 of FIG. 2 may be modified to include a phase delay controller 350 to create a phase-delayed opto-isolated receiver 320. The phase delay controller 350 may provide nanosecond control of the data sampling time relative to the CLK signal. The phase-delayed opto-isolated receiver 320 is similar to the opto-isolated receiver 130 except that the phase-delayed opto-isolated receiver 320 includes the phase delay controller 350. The phase delay controller 350 may be preset to a specific phase delay (e.g., one half clock cycle) to act as the phase-delayed opto-isolated receiver 320 of FIG. 3 for operation in the first mode (e.g., the record only mode) described above. However, in example embodiments in which the phase-delayed opto-isolated receiver 320 operates in the second mode, the phase delay controller 350 can be used to modify the phase delay in real-time. In such an example, the results of modifying the phase delay can be viewed on the output terminal 330 while the user modifies the phase delay via the phase delay controller 350. Moreover, both data streams can be viewed simultaneously (while also being recorded simultaneously). For one of the channels (e.g., the channel having the phase delay controller 350), the user can reduce and increase the phase delay and watch how the results of such modification affect the resulting output. Meanwhile, the other channel (i.e., the channel that is not phase delayed) may be recorded, so no data are lost as the user adjusts the channel with the variable phase delay.

If the user is able to find the point at which the quality of processing the DATA signal is lost moving in each direction (increasing and decreasing the phase delay), the user may identify a point roughly in the middle between the two points where quality is lost. The point roughly in the middle between the two points at which quality is lost may effectively serve as the "sweet spot". The user may then elect to monitor and/or record the data on the delayed channel after the delayed channel has been tuned or otherwise selected for operation at the sweet spot.

In an example embodiment, the phase delay controller 350 may be any means such as a device or circuitry embodied in either hardware, or a combination of hardware and software that is configured to perform the corresponding functions of the phase delay controller 350 as described herein. The phase delay controller 350 may be controlled directly by the user, either at the terminal or remotely, or it may be controlled by the user application on the terminal. Thus, in some cases, the user interface of the output terminal 330 may enable the user to input the phase delay value to the phase delay controller 350, and in others the user application may select the optimal phase delay.

As may be appreciated from the descriptions herein, some example embodiments may be practiced using an apparatus such as the one described in reference to FIGS. 2 and 4 within the context of the systems of FIGS. 1 and 3. The apparatuses of FIGS. 2 and 4 may be SDDARs that can individually or in combination be parts of a test range data acquisition system. The system may include a first SDDAR operably coupled to a first output terminal and (in some cases also) a second SDDAR operably coupled to a second output terminal. The first SDDAR may receive both CLK signal and a DATA signal. The second SDDAR may be operably coupled to the first SDDAR to receive the CLK and DATA signals. Each of the first and second SDDARs may include an opto-isolator assembly, through which both the CLK and DATA signals pass upon receipt of the CLK and DATA signals at the first and second SDDARs, respectively, sampling logic and a USB interface. The sampling logic may be operably coupled to the opto-isolator assembly, and may be configured to determine a point at which to sample the DATA signal based on state changes in the CLK signal. The USB interface may be operably coupled to the sampling logic and a respective one of the first output terminal and second output terminal. The USB interface may be configured to provide a first serial telemetry data stream from the first SDDAR for processing, display or recording at the first output terminal and to provide a second serial telemetry data stream from the second SDDAR for processing, display or recording at the second output terminal. The USB interface may be further configured to enable the first SDDAR and the second SDDAR to be powered from the first output terminal and second output terminal, respectively.

In some cases, the system or apparatuses described above may also be modified, augmented or amplified in some cases. For example, in some embodiments, the opto-isolator assembly may be embodied as a high speed optocoupler, photocoupler, or optical isolator. In an example embodiment, the first and second SDDARs may each be configured to translate serial telemetry data into a computer domain of the first and second output terminals, respectively, to enable real-time processing and display at the first and second output terminals, respectively. In some cases, the SDDARs may each require no device drivers to be provided on the respective output terminals to enable interoperability of the output terminals with the SDDARs. In some examples, the first and second output terminals may be a single (i.e., the same) output terminal. In an example embodiment, the CLK signal input to the second SDDAR is phase delayed by a half clock cycle relative to the first SDDAR. In some cases, the second SDDAR may include a phase delay controller configured to enable insertion of a phase delay to the CLK signal relative to the CLK signal input to the first SDDAR. In some embodiments, a user is enabled to input the phase delay via interface with the phase delay controller. In such an example, the user may provide the input via the same output terminal. In an example embodiment, the user may be enabled to select at least one of the first serial telemetry data stream or the second serial telemetry data stream for recording at the same output terminal. Additionally or alternatively, the user may be enabled to select the first serial telemetry data stream for recording while the second serial telemetry data stream is displayed and the phase delay to the CLK signal is adjusted via the phase delay controller.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A serial digital data acquisition receiver comprising:
an opto-isolator assembly through which both a serial telemetry clock (CLK) signal and a serial telemetry data (DATA) signal pass upon receipt of the CLK and DATA signals at the serial digital data acquisition receiver;
sampling logic operably coupled to the opto-isolator assembly, the sampling logic being configured to determine a point at which to sample the DATA signal based on state changes in the CLK signal; and
a universal serial bus (USB) interface operably coupled to the sampling logic and an output terminal, the USB interface being configured to provide telemetry data for processing, display or recording at the output terminal, and configured to enable the serial digital data acquisition receiver to be powered from the output terminal, wherein
the serial digital data acquisition receiver is configured to translate serial telemetry data into a computer domain of the output terminal to enable real-time processing and display at the output terminal, and
the serial digital data acquisition receiver requires no device drivers to be provided on the output terminal to enable interoperability of the output terminal with the serial digital data acquisition receiver.

2. The serial digital data acquisition receiver of claim 1, wherein the opto-isolator assembly comprises a high speed optocoupler, a photocoupler, or an optical isolator.

3. A serial digital data acquisition system comprising:
a first serial digital data acquisition receiver operably coupled to a first output terminal, the first serial digital data acquisition receiver receiving both a range telemetry clock (CLK) signal and a range telemetry data (DATA) signal; and at least a second serial digital data acquisition receiver operably coupled to a second output terminal, the second serial digital data acquisition receiver being operably coupled to the first serial digital data acquisition receiver to receive the CLK and DATA signals, each of the first and second serial digital data acquisition receivers comprising:

an opto-isolator assembly through which both the CLK and DATA signals pass upon receipt of the CLK and DATA signals at the first and second serial digital data acquisition receivers, respectively;

sampling logic operably coupled to the opto-isolator assembly, the sampling logic being configured to determine a point at which to sample the DATA signal based on state changes in the CLK signal; and a universal serial bus (USB) interface operably coupled to the sampling logic and a respective one of the first output terminal and second output terminal, the USB interface being configured to provide a first serial telemetry data stream from the first serial digital data acquisition receiver for processing, display or recording at the first output terminal and to provide a second serial telemetry data stream from the second serial digital data acquisition receiver for processing, display or recording at the second output terminal, wherein the USB interface is further configured to enable the first serial digital data acquisition receiver and the second serial digital data acquisition receiver to be powered from the first output terminal and second output terminal, respectively, and wherein the first and second serial digital data acquisition receivers are each configured to translate serial telemetry data into a computer domain of the first and second output terminals, respectively, to enable real-time processing and display at the first and second output terminals, respectively.

4. The serial digital data acquisition system of claim 3, wherein the opto-isolator assembly comprises a high speed optocoupler, a photocoupler, or an optical isolator.

5. The serial digital data acquisition system of claim 3, wherein the first and second serial digital data acquisition receivers each require no device drivers to be provided on the first and second output terminals, respectively, to enable interoperability of the first and second output terminals with corresponding ones of the first and second serial digital data acquisition receivers.

6. The serial digital data acquisition system of claim 3, wherein the first and second output terminals are the same output terminal.

7. The serial digital data acquisition system of claim 6, wherein the CLK signal input to the second serial digital data acquisition receiver is phase delayed by a half clock cycle relative to the first serial digital data acquisition receiver.

8. The serial digital data acquisition system of claim 6, wherein the second serial digital data acquisition receiver comprises a phase delay controller configured to enable insertion of a phase delay to the DATA signal relative to the CLK signal input to the first serial digital data acquisition receiver.

9. The serial digital data acquisition system of claim 8, wherein a user is enabled to input the phase delay via interface with the phase delay controller.

10. The serial digital data acquisition system of claim 9, wherein the user provides the input via the same output terminal.

11. The serial digital data acquisition system of claim 8, wherein a user is enabled to select at least one of the first serial telemetry data stream or the second serial telemetry data stream for recording at the same output terminal.

12. The serial digital data acquisition system of claim 8, wherein a user is enabled to select the first serial telemetry data stream for recording while the second serial telemetry data stream is displayed and the phase delay to the DATA signal relative to the CLK signal is adjusted via the phase delay controller.

13. A dual autonomous telemetry acquisition system comprising:

a first serial digital data acquisition receiver operably coupled to an output terminal, the first serial digital data acquisition receiver receiving both a range telemetry clock (CLK) signal and a range telemetry data (DATA) signal; and a second serial digital data acquisition receiver operably coupled to the output terminal, the second serial digital data acquisition receiver being operably coupled to the first serial digital data acquisition receiver to receive the CLK and DATA signals, each of the first and second serial digital data acquisition receivers comprising:

an opto-isolator assembly through which both the CLK and DATA signals pass upon receipt of the CLK and DATA signals at the first and second serial digital data acquisition receivers, respectively;

sampling logic operably coupled to the opto-isolator assembly, the sampling logic being configured to determine a point at which to sample the DATA signal based on state changes in the CLK signal; and a universal serial bus (USB) interface operably coupled to the sampling logic and the output terminal, the USB interface being configured to provide a first serial telemetry data stream from the first serial digital data acquisition receiver and a second serial telemetry data stream from the second serial digital data acquisition receiver for processing, display or recording at the output terminal, wherein the USB interface is further configured to enable the first serial digital data acquisition receiver and the second serial digital data acquisition receiver to each be powered from the output terminal, wherein the second serial digital data acquisition receiver comprises a phase delay controller configured to enable insertion of a phase delay to the DATA signal relative to the CLK signal input to the first serial digital data acquisition receiver, and wherein the phase delay controller is configured to insert the phase delay to the DATA signal to delay the DATA signal by a half clock cycle relative to the CLK signal received at the first serial digital data acquisition receiver.

14. The dual autonomous telemetry acquisition system of claim 13, wherein a user is enabled to input the phase delay via local or remote interface with the phase delay controller.

15. The dual autonomous telemetry acquisition system of claim 13, wherein the phase delay controller is configured to vary the phase delay to the DATA signal to delay the DATA signal by a selected amount relative to the CLK signal received at the first serial digital data acquisition receiver.

16. The dual autonomous telemetry acquisition system of claim 15, wherein a user is enabled to select the first serial telemetry data stream for recording while the second serial telemetry data stream is displayed and the phase delay to the DATA signal relative to the CLK signal is adjusted by the selected amount via the phase delay controller.

* * * * *